July 16, 1929. W. C. TODD ET AL 1,721,237
LAWN SPRINKLER
Filed July 12, 1926

INVENTOR
William C. Todd.
James W. Pomeroy.
BY
Albert E. Dietrich
ATTORNEY

Patented July 16, 1929.  1,721,237

UNITED STATES PATENT OFFICE.

WILLIAM CHARLES TODD AND JAMES WILLIAM POMEROY, OF VICTORIA, BRITISH COLUMBIA, CANADA.

LAWN SPRINKLER.

Application filed July 12, 1926. Serial No. 122,010.

The invention relates to the reaction type of lawn sprinklers and it has for its object to provide a very simple and inexpensive device by which two nozzles take care of different areas, the one sprinkling a central area and the other the area surrounding the central area; to provide a simple means whereby the speed of rotation of the nozzles around the axis of the sprinkler may be adjusted as desired so that the sprinkler may be set to make one complete revolution in ten to fifteen minutes, or it may be set to rotate several revolutions per minute; to provide a reaction sprinkler with a principal nozzle fixed on a long arm to drive the sprinkler in a definite direction (preferably clockwise) and sprinkling an area of long radius, and an adjustable nozzle on a short arm to sprinkle the inner area and to serve as a means by which the rotating power of the fixed nozzle may be augmented or retarded (according to the adjustment of the second nozzle), thereby increasing or diminishing the speed of action of the device without interfering with the regular water capacity of the device.

More specifically the invention also resides in those novel features of construction, combination and arrangement of parts, all of which will be first fully described, then be specifically pointed out in the appended claims, reference being had to the accompanying drawing, in which:—

Figure 1:
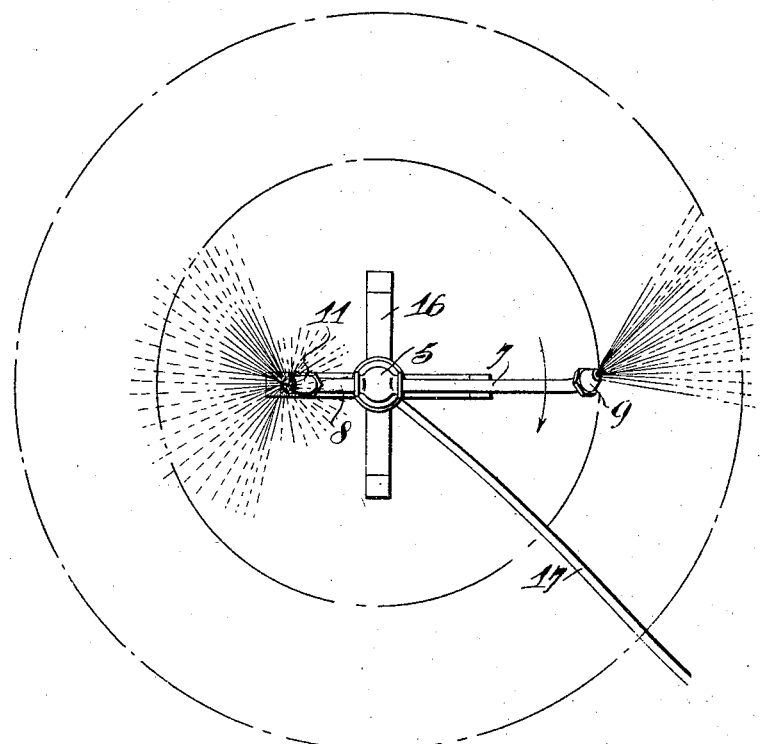
Figure 1 is a diagrammatic plan view indicating the areas sprinkled by the respective nozzles.
Figure 2:
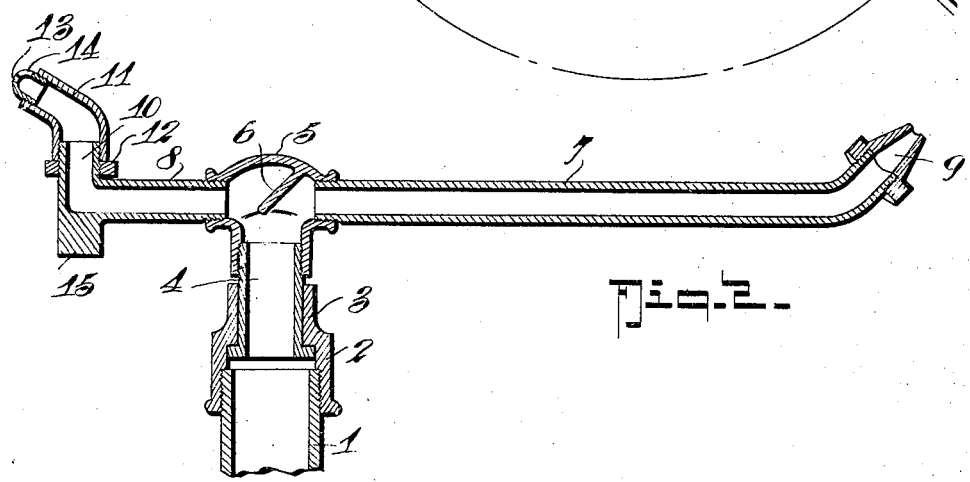
Figure 2 is a vertical longitudinal section of a portion of the sprinkler, showing the long and short arms with their nozzles, the section being taken on substantially the line 2—2 of Figure 3.

In the drawing, in which like numerals of reference indicate like parts in all the figures, 1 is a stand pipe mounted on a suitable base 16 and to which the water is supplied by hose connection 17 from the source of water supply. The stand pipe 1 carries a nipple 2 having a bearing 3 for the hollow stem 4 to which the cross coupling 5 is secured, the latter having a baffle 6 to pass a greater quantity of water to the long arm 7 than to the short arm 8 of the sprinkler. Since the arms 7 and 8 project radially in a horizontal plane from the member 5 and since the arm 7 is the longer arm, the nozzle 9 travels through a larger arc than that travelled by the nozzle 13 (see Figure 1) and hence waters a greater area of ground than that watered by the nozzle 13. The baffle 6 is provided to supply the necessary increase in volume of water to the longer arm so that the ground may be watered uniformly with both nozzles 9 and 13 fully opened. The arms 7 and 8 are positioned directly opposite one another and the arm 7 carries an upwardly and laterally turned nozzle 9 which is fixed, so far as adjustment is concerned, and directs its stream in a constant direction.

Figure 3:
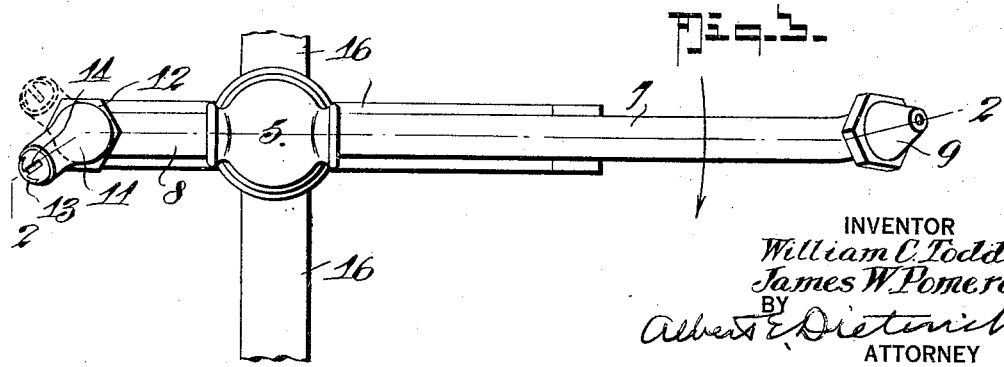
Figure 3 is a plan view of the parts shown in Figure 2 showing the nozzle on the short arm set to augment the rotating action of the primary nozzle (in full lines) and in dotted lines showing the second nozzle positioned to oppose the action of the main nozzle and retard the rotation of the device.

The short arm 8 has a right angled upturned end 10 to which is threaded the second nozzle 11 and jam nut 12, the latter nut being adjustable on the axis of the upturned end 10, the nozzle 11 being angled upwardly and being susceptible of being adjusted around the axis of the upturned end 10 to one side or the other (see Figure 3) whereby it may be used to augment or retard the rotating action of the nozzle 9.

The nozzle 11 has a tip provided with a T slot consisting of the transverse portion 13 and the vertical portion 14. By this arrangement the nozzle 11 will eject a flat stream and a vertical stream to water the area within the band watered by the nozzle 9. In other words, the nozzle 11 is the near water distributing nozzle and the nozzle 9 is the far water distributing nozzle.

15 is a counterweight on the arm 8, which added to the weight of the arm 8 and the nozzle 11 will equalize the weight of the arm 7 and nozzle 9 so that when the sprinkler is used on steep hills the operation will not be interfered with by reason of a lack of balance.

From the foregoing description, taken in connection with the accompanying drawing, it is thought the complete construction, operation and advantages of my invention will be clear to those skilled in the art to which it relates.

What we claim is:

1. In reaction type water sprinklers, a stand pipe, a T-coupling swivelly mounted on said stand pipe, a long tubular arm secured to the coupling, a short tubular arm secured to the coupling, said arms both extending radially of the coupling, a main reaction nozzle secured to the long arm to water a band-area at a distance from the device, a second nozzle adjustably mounted on a vertical axis and having a laterally directed outlet on the short arm to water the area within the band-area and to serve as an accelerator or retarder of the turning action of the main nozzle accordingly as said second nozzle is adjusted in one or another position, said cross coupling having a baffle within it positioned to shunt a greater volume of water toward the main nozzle than toward the second nozzle.

2. In reaction sprinklers, a stand pipe, a nipple swivelly mounted on said stand pipe to turn on a vertical axis, a T-coupling secured to the nipple, a long tubular arm and a short tubular arm secured to the T-coupling and projecting radially in opposite directions, a main nozzle fixedly mounted on the end of the long arm and angled slightly from the vertical and bent away from a radial plane to effect rotation of the device on the axis of the nipple, said short arm having an upturned end, a second nozzle adjustably secured on said upturned end for adjustment on a vertical axis and having a laterally directed outlet, means to hold said second nozzle in different positions of adjustment around its vertical axis, whereby it may be used to accelerate or retard the rotation of the main nozzle, a counterweight on the short arm and a baffle within the T-coupling positioned to divert more water to the longer arm than to the shorter arm, all being arranged whereby a constant volume of water will be sprinkled regardless of the adjustment of the said second nozzle, said nozzles being arranged to discharge water in an outer band and a central area respectively.

WILLIAM CHARLES TODD.
JAMES WILLIAM POMEROY.